Nov. 12, 1946.   G. B. BENANDER   2,411,018
WIRING DEVICE
Original Filed April 11, 1942   2 Sheets-Sheet 1
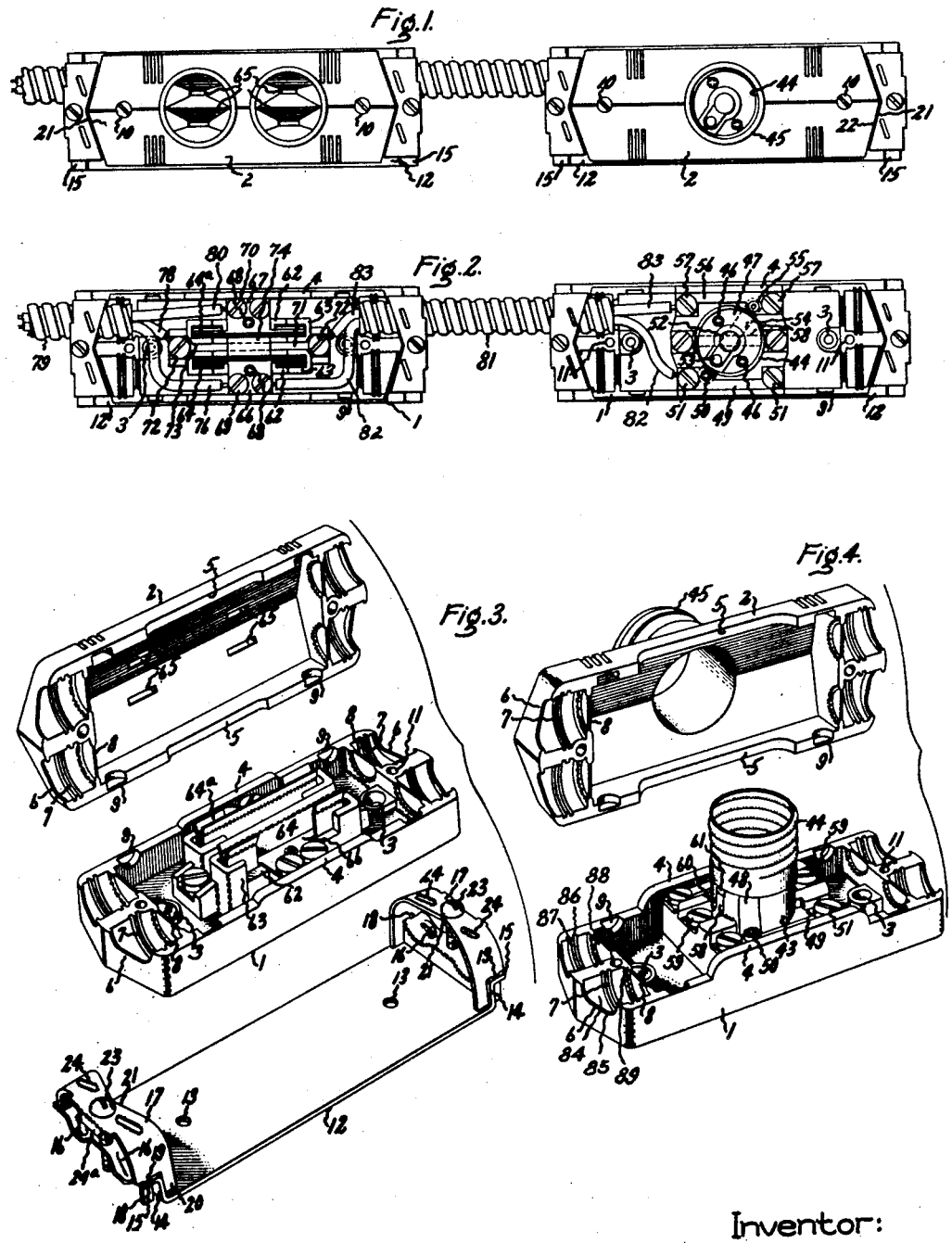
Inventor:
George B. Benander,
by Harry E. Dunham
His Attorney.

Nov. 12, 1946.  G. B. BENANDER  2,411,018
WIRING DEVICE
Original Filed April 11, 1942  2 Sheets-Sheet 2
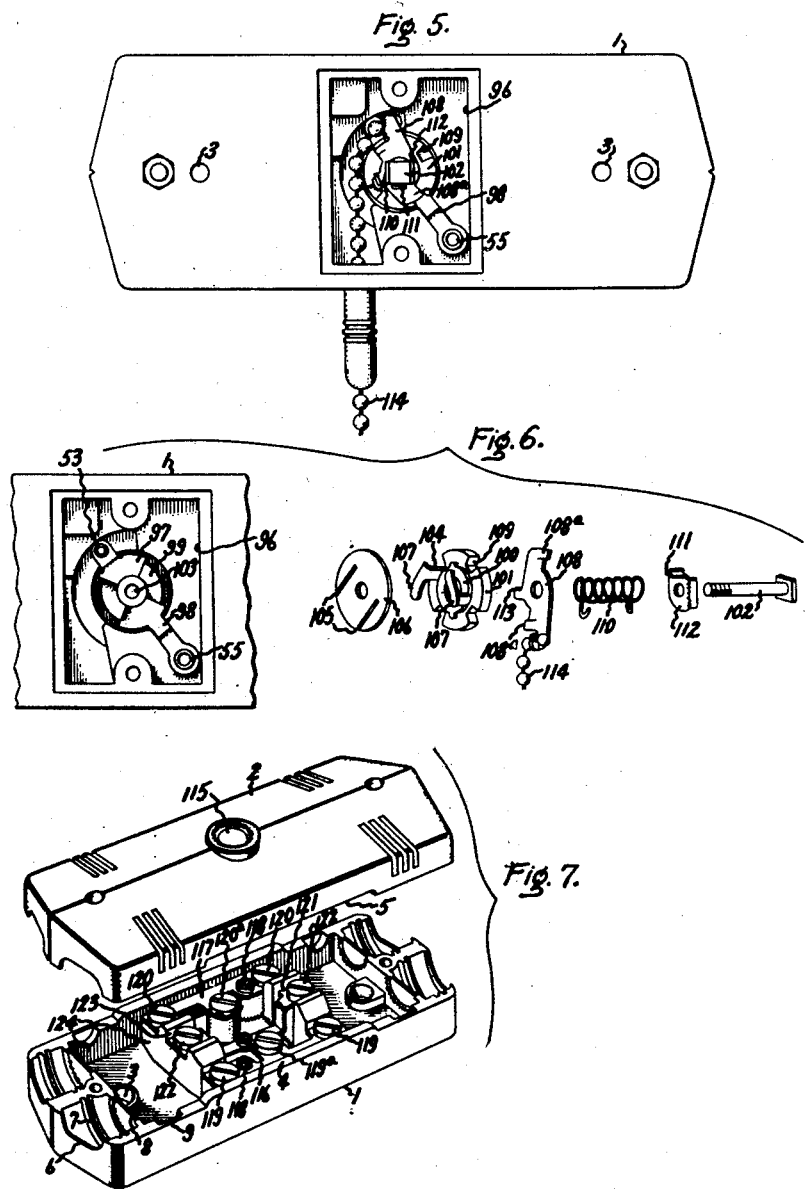
Inventor:
George B. Benander,
by Harry E. Dunham
His Attorney.

Patented Nov. 12, 1946

2,411,018

UNITED STATES PATENT OFFICE 2,411,018

WIRING DEVICE

George B. Benander, Oaklawn, R. I., assignor to Monowatt Electrical Corporation, a corporation of Connecticut Original application April 11, 1942, Serial No. 438,545. Divided and this application April 19, 1944, Serial No. 531,798

3 Claims. (Cl. 173—338)

This application is a division of my application Serial No. 438,545, filed April 11, 1942, issued as Patent 2,362,794, on November 14, 1944.

The present invention relates to wiring devices of the type in which the device is part of the box for enclosing the connections to the power conductors. Such a wiring device is particularly adapted to surface wiring systems, and may be termed a combined outlet and outlet box.

It is desirable that the devices be capable of use in wiring systems using metallic armored cable, non-metallic cable (cable having a non-metallic sheath or armor) and knob and tube open wiring. In the metallic armored cable system, a continuous ground connection must be carried through the metallic armor. In the present invention this is done by means of a ground strap used interchangeably with each of the devices and having clamps for holding the cable and making the ground connection to the metallic armor. In systems using non-metallic cable or open wiring, the ground strap is not necessary and its expense is eliminated.

The object of my invention is to provide an improved construction and arrangement in wiring devices of this type, and for a consideration of what I believe to be novel and my invention, attention is directed to the following description and the claims appended thereto.

In the accompanying drawings, Fig. 1 is a top plan view of part of a surface wiring system using metallic armored power conductors and wiring devices embodying my invention; Fig. 2 is a view similar to Fig. 1 with the covers of the wiring devices removed; Fig. 3 is an exploded perspective view of the convenience outlet appearing in Fig. 1; Fig. 4 is an exploded perspective view of the lamp socket appearing in Fig. 1; Fig. 5 is a bottom plan view of the pull-chain lamp socket; Fig. 6 is an exploded view of the pull-chain switch; and Fig. 7 is an exploded perspective view of the rosette or junction box.

Referring to the drawings, each of the wiring devices has an elongated base 1 and a cover 2 both of which may be made of suitable molded insulating material. The base is provided with screw holes 3 for attachment to a supporting surface and is narrow enough so that it can be attached to the narrow edge of two-by-four framing when used in an open wiring system. Along the sides of the base members are projections 4 which are of different sizes and which fit in corresponding depressions 5 in the sides of the respective covers. The projections and depressions 4 and 5 insure that the covers are assembled with and properly positioned on the bases for which they are designed. At each end of the device are two openings for armored power conductors. The openings are formed partly in the base and partly in the cover and are blocked by knockouts 6, 7, and 8 of different sizes, one or more of which are removed depending upon the size and type of power conductor to be connected to the device. Along the sides of the cover and base at each end are knockouts 9 for use in open wiring. The covers are attached to the respective bases by screws 10 threaded into sockets 11 in the base, and when assembled the base and cover serve as an outlet box for enclosing the device and its connections with the power conductors clamped between the cover and base.

When the wiring devices are used with metallic armored cable, the ground connection to the armor is made through a ground strap 12 having screw holes 13 in line with the screw holes 3 in the base so that the ground strap and base are secured to the support by the same screws. The base is seated on the ground strap with its ends confined between upwardly extending flanges 14 at the ends of the ground strap. At the top the flanges 14 are bent outwardly to provide horizontal flanges 15 which are suitably indented at 16 to provide the lower half of a clamp for gripping metallic armored cable. The upper half of the clamp is provided by a clamping member 17 having tongues 18 slidable in slots 19 in the flanges 15 and having tongues 20 extending along the inner faces of the flanges 14. The upper clamping member 17 at its top is provided with a tapered recess 21 of the same shape as the tapered projection 22 at the ends of the base and cover so the device may be assembled on the ground strap without disassembling the clamp. The tongues 20 which project inwardly beyond the extreme ends of the base and cover serve to locate the device on the ground strap. The clamping members are held together by screws 23 extending loosely through the center of the upper clamping member 17 and threaded into the center of the flange 15. The upper clamping member is indented at 24 and is provided with a flange 24a for more effectively gripping metallic cable. As shown more clearly in Fig. 2, the openings through the clamps are in line with the openings in the device.

In the lamp socket, as shown more clearly in Fig. 4, the base 1 is provided at the center with a cylindrical projection 43 on the upper end of which is mounted a screw shell 44, and the cover 2 is provided with a cylindrical projection 45 surrounding the upper end of the screw shell. The screw shell is fixed on the upper end of the projection 43 by screws 46 threaded into the projection through a flange 47 at the bottom of the screw shell. Integral with the screw shell is a metal strip 48 connected to a terminal strip 49 by means of a screw 50 threaded through the strips 48 and 49 into the base. The strip 49 at opposite ends is provided with terminal screws 51. Within the screw shell is a center contact 52 fixed to the upper end of the projection 43 by a rivet 53 which connects the center contact to one end of strip 54 on the under side of the projection 43. The other end of the strip 54 is connected by a rivet 55 to a terminal strip 56 provided at opposite ends with terminal screws 57. The socket terminal screws 51 and 57, are at opposite sides of the base. At the center of the base is a terminal strip or bus bar 58 provided at opposite ends with terminal screws 59 and extending up over the top of the projection 43 through a groove 60. The bus bar 58 extends beneath the screw shell 44 and center contact 52 and is insulated therefrom by a strip of insulating material 61 in the groove 60 on top of the bus bar 58. The bus bar 58 eliminates the need for jumpers.

The lamp sockets may be provided with a pull-chain switch (Figs. 5 and 6) arranged in a cavity 96 in the under side of the base and having contacts 97 and 98 respectively connected to the lower ends of the rivets 53 and 55. The cavity may be closed by a plate of insulating material (not shown). The contacts 97 and 98 rest on alternate ratchet faces 99 molded in the base. The circuit between contacts 97 and 98 is alternately made and broken by a bridging member 100 on disk 101 rotatable on a spindle 102 threaded into a hole 103. The bridging member has arms 104 projecting through slots 105 in a disk of insulating material 106 and terminating in contacts 107. The bridging member is rotated in a counterclockwise direction (Fig. 6) through successive "on" and "off" positions by a member 108 having ratchet teeth 108a cooperating with notches 109 in the disk 101. The member 108 is biased in a clockwise direction by a coil spring 110 having opposite ends hooked over a tang 111 on a washer 112 non-rotatable on the head of spindle 102 and over a tang 113 on the ratchet member 108. The member 108 is rotated in a counterclockwise direction by a pull-chain 114 extending out through a suitable opening in the side of the base.

The base 1 of the convenience outlet has a projection 62 at each end of which is a pair of U-shaped walls 63 receiving terminals 64 and 64a for connection with the prongs of an attachment plug inserted through openings 65 in the cover. The terminals 64 and 64a are respectively integral with terminal strips 66 and 67 fixed to the projections 62 by screws 68 and equipped respectively with terminal screws 69 and 70. The terminal screws 69 are for connection with the ground conductor, and the terminal screws 70 are for connection with the live conductor. Extending along the base between the terminals 64 is a bus bar or terminal strip 71 having terminal screws 72 at opposite ends. The bus bar 71 is seated in a groove 73 in the base and is held therein by a strip of insulating material 74 which is clamped under the terminal strips 66 and 67. The bus bar 71 eliminates the need for jumpers in the same manner as the bush bar 58 in the previously described constructions.

In the wiring system shown in Figs. 1 and 2, the incoming power line is a three-conductor cable 79 having live conductors 78 and 80 connected respectively to one end of the feed-through bus 71 and to the terminal screw 70 and a ground conductor 76 connected to the terminal screw 69. The lamp socket is fed by a cable 81 having a ground conductor 82 connected to the remaining ground terminal screw 69 of the convenience outlet and a conductor 83 connected to the terminal screw 72 at the other end of the bus bar 71. The conductors 82 and 83 are respectively connected to the ground and live terminal screws 51 and 57 of the lamp socket.

The device shown in Fig. 7 may be either a rosette or a junction box, depending on whether or not a knockout 115 in the cover is removed. At opposite sides of the base are terminal strips 116 and 117 fastened thereto by screws 118. The terminal strips are provided with terminal screws 119 and 120 at opposite ends and terminal screws 119a and 120a at the center. At the center of the base is a bus bar 121 having terminal screws 122 at opposite ends arranged in notches 123 in bosses 124 which separate the terminal screws 119 and 120. The terminal screws 122 are somewhat higher than the other terminal screws. Between the terminal screws 122 the bus bar 121 is bent to provide a U-shaped connecting portion the base of which is below the center terminal screws 119a and 120a. The drop center construction of the bus bar 121 provides ample clearance between the bus bar and terminal screws 119a and 120a to which conductors would be connected when the device is used as a rosette.

In each of the above described wiring devices the device and its enclosing box comprise a complete unit with the openings and clamps for power conductors. The terminals for the device are located on opposite sides of the enclosing box, and at the center is a bus bar insulated from the device which, as described above, may be used to feed a circuit through the device without the use of jumpers or other connections. The wiring is accordingly simplified since all of the wiring connections are made to terminal screws.

The use of the devices is further simplified by the conductor clamping arrangement having knockouts 6, 7, and 8 for use with #12 and #14 two- and three-conductor metallic and non-metallic armored cable and knockouts 9 for use with #12 and #14 open wiring. The knockouts 6, 7, and 8 are spaced apart along conductor receiving grooves 84 at each end of the base 1 and cover 2. The knockouts 6 are at the outer ends of the grooves and have surfaces 85 for gripping two-conductor non-metallic cable in sizes #12 and #14. The knockouts 7 are arranged in channels 86 transverse to the length of the grooves 84 and have surfaces 87 projecting above the grooves 84 for gripping three-conductor non-metallic and armored cable in size #14 and two-conductor armored cable in sizes #12 and #14. The knockouts 7 may be removed by a screw driver or similar prying tool inserted into the space between the knockout and the sides of the channel 86. The knockouts 8 have thin removable sections 88 at the inner edges of ribs 89. The sections 88 form closures for the grooves 84 and when removed provide sufficient space for leading the conductors into the device as illustrated in Figs. 2 and 6. The grooves 84 are shaped to properly grip the largest conductors (three-conductor #12 non-metallic and armored cable for which the devices are designed. By removing one or more of the knockouts 6, 7, and 8, the device may be used with the customary sizes of armored cable. No adjustment of the conductor clamp is required other than the selective removal of the proper knockouts.

What I claim as new and desire to secure by Letters Patent of the United States is:

1. In a combined outlet and outlet box, a box having openings for power conductors leading into and out of the box, said box having a base for attachment to a support, a projection on the base having a screw shell and center contact mounted on top of said projection, terminals on opposite sides of the box connected respectively to the screw shell and center contact, a bus bar extending over the projection intermediate the terminals and beneath and insulated from the screw shell and center contact, and a cover enclosing the parts on the base and having a part surrounding the screw shell and defining an opening in line with the screw shell.

2. In a combined outlet and outlet box, a box having openings for power conductors leading into and out of the box, said box having a base for attachment to a supporting surface, a support on the base for a pair of outlet contacts, terminals on opposite sides of the box connected to one and the other of said contacts respectively, a feed-through bus bar intermediate said terminals extending through an insulating groove in the support beneath said contacts and having terminals at opposite ends for connection with a feed-through conductor and a strip of insulating material overlying said bus bar and being clamped in position by said contacts to hold said bus bar in position.

3. In a combined outlet and outlet box for wiring with metallic or non-metallic armored cable, a box of insulating material having cable admission openings at opposite ends, said box having a base for attachment to a supporting surface and a detachable cover, bus bars at opposite sides of the base having terminals at the ends for connection with cable led in through said openings, a support on the base intermediate its ends for a pair of outlet contacts, means connecting the bus bars to one and the other of said contacts respectively, a feed-through bus bar intermediate said bus bars extending through an insulating groove in the support beneath said contacts and having terminals at opposite ends for connection with a feed-through conductor and a plate of insulating material overlying said feed-through bus bar and being clamped to said support for holding said bus bar in position.

GEORGE B. BENANDER.